(12) United States Patent
Ye et al.

(10) Patent No.: US 9,559,985 B1
(45) Date of Patent: Jan. 31, 2017

(54) WEIGHTED COST MULTIPATH ROUTING WITH INTRA-NODE PORT WEIGHTS AND INTER-NODE PORT WEIGHTS

(71) Applicant: GOOGLE INC., Mountain View, CA (US)

(72) Inventors: Fei Ye, Mountain View, CA (US); Subhasree Mandal, San Jose, CA (US); Wei Sun, Mountain View, CA (US); Min Zhu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 14/216,433

(22) Filed: Mar. 17, 2014

Related U.S. Application Data

(60) Provisional application No. 61/932,385, filed on Jan. 28, 2014.

(51) Int. Cl.
*H04L 12/933* (2013.01)
*H04L 12/54* (2013.01)

(52) U.S. Cl.
CPC .......... *H04L 49/15* (2013.01); *H04L 49/1515* (2013.01); *H04L 12/56* (2013.01); *H04L 12/5601* (2013.01); *H04L 49/1569* (2013.01)

(58) Field of Classification Search
CPC ...... H04L 12/56; H04L 12/5601; H04L 45/00; H04L 45/02; H04L 45/24; H04L 45/745; H04L 47/263; H04L 49/25; H04L 49/1515; H04L 49/1569; H04L 2012/5651; H04L 2012/5679; H04L 2012/5681
See application file for complete search history.

(56) References Cited

U.S. PATENT DOCUMENTS

| | | | |
|---|---|---|---|
| 6,345,040 B1 * | 2/2002 | Stephens | H04L 12/5602 370/232 |
| 6,456,588 B1 | 9/2002 | Simmons | |
| 6,563,787 B1 * | 5/2003 | Ramaswamy | H04L 12/5601 370/229 |

(Continued)

OTHER PUBLICATIONS

"Configuring OSPF", Chapter 11, ServerIron ADX Switching and Routing Guide, Brocade Communication Systems, Inc., 2009, 46 pages.

(Continued)

*Primary Examiner* — Michael Thier
*Assistant Examiner* — Eric Nowlin
(74) *Attorney, Agent, or Firm* — McDermott Will & Emery LLP

(57) ABSTRACT

A technique includes determining a first set of intra-node port weights for a first switch of a first routing node, determining a set of inter-node port weights including a first inter-node port weight for routing traffic to a second routing node, determining a first inter-node weighted port group for the first switch for traffic directed to the second routing node, the first inter-node weighted port group including a first total port weight based on a first intra-node port weight and the first inter-node port weight and which is applied to a first port of the first switch, and a second total port weight based on a second intra-node port weight and the first inter-node port weight and which is applied to the second port of the first switch, and routing traffic to an output port of the first switch based on the first inter-node weighted port group.

14 Claims, 8 Drawing Sheets

(56) References Cited

U.S. PATENT DOCUMENTS

| | | | |
|---|---|---|---|
| 7,099,355 B1* | 8/2006 | Johnson | H04L 49/30 370/413 |
| 7,636,309 B2* | 12/2009 | Alicherry | H04L 45/02 370/229 |
| 2003/0035432 A1* | 2/2003 | Sreejith | H04L 12/5601 370/415 |
| 2013/0287020 A1* | 10/2013 | York | H04L 49/15 370/389 |

OTHER PUBLICATIONS

"OpenFlow Switch Specification", Open Networking Foundation, Version 1.3.0 (Wire Protocol 0x04), Jun. 25, 2012, 106 pages.

Al-Fares, et al, "A Scalable, Commodity Data Center Network Architecture", SIGCOMM'08, Aug. 17-22, 2008, 12 pages.

Li, et al, "A Multiple-Path Routing Algorithm with Congestion Avoidance Based upon Ant Colony Algorithm in Cognitive Networks", Journal of Computational Information Systems 6:8, 2010, pp. 2473-2482.

McKeown, et al, "OpenFlow: Enabling Innovation in Campus Networks", ACM SIGCOMM Computer Communication Review, vol. 38, Issue 2, Mar. 14, 2008, 6 pages.

Sohn, et al, "Congestion-triggered Multipath Routing based on Shortest Path Information", ICCCN, 2006, pp. 191-196.

Villamizar, "OSPF Optimized Multipath (OSPF-OMP)", Internet Engineering Task Force, Feb. 24, 1999, 38 pages.

Zhang, et al, "Optimizing Network Performance using Weighted Multipath Routing", 21st International Conference on Computer Communications and Networks, 2012, 7 pages.

\* cited by examiner

US 9,559,985 B1

WEIGHTED COST MULTIPATH ROUTING WITH INTRA-NODE PORT WEIGHTS AND INTER-NODE PORT WEIGHTS

PRIORITY CLAIM

This application claims priority to U.S. Provisional Application No. 61/932,385, filed on Jan. 28, 2014, and entitled "WEIGHTED COST MULTIPATH ROUTING WITH INTRA-NODE PORT WEIGHTS AND INTER-NODE PORT WEIGHTS," hereby incorporated by reference.

TECHNICAL FIELD

This description relates to routing and a weighted cost multipath routing with intra-node and inter-node port weights.

BACKGROUND

Routers or switches in a network are typically responsible for receiving and forwarding packets. Each switch may perform a routing decision for each packet by, for example, performing a lookup into a forwarding table to identify an output port for forwarding the packet. Various routing algorithms have been used by switches or routers to identify an output port for forwarding each packet.

SUMMARY

According to a general aspect, a method is provided. The method may include determining a first set of intra-node port weights for a first switch of a first routing node, determining a set of inter-node port weights including a first inter-node port weight for routing traffic to a second routing node, determining a first inter-node weighted port group for the first switch for traffic directed to the second routing node, the first inter-node weighted port group including a first total port weight based on a first intra-node port weight and the first inter-node port weight and which is applied to a first port of the first switch, and a second total port weight based on a second intra-node port weight and the first inter-node port weight and which is applied to the second port of the first switch, and routing, by the first switch, traffic directed to the second routing node to one of a plurality of output ports of the first switch based on the first inter-node weighted port group.

In an example implementation, each of the intra-node port weights of the first set of intra-node port weights may be determined based on a total amount of bandwidth output from a respective next hop switch to the second routing node divided by a number of links from the first switch to the respective next hop switch.

In an example implementation, the method may further include determining a second set of intra-node port weights for a first switch of a first routing node, determining a set of inter-node port weights including a first inter-node port weight for routing traffic to the second routing node and a second inter-node port weight for routing traffic to third routing node, and determining a second inter-node weighted port group for the first switch for traffic directed to the third routing node, the second inter-node weighted port group including a third total port weight based on a first intra-node port weight and the first inter-node port weight and which is applied to a first port of the first switch, and a second total port weight based on a second intra-node port weight and the first inter-node port weight and which is applied to the second port of the first switch.

In an example implementation, each of the intra-node port weights of the second set of intra-node port weights being determined based on a total amount of bandwidth output from a respective next hop switch to a third routing node divided by a number of links from the first switch to a respective next hop switch.

In an example implementation, the routing may further include routing, by the first switch, traffic directed to the third routing node to one of a plurality of output ports of the first switch based on the second inter-node weighted port group.

In an example implementation, the method may further include updating a forwarding table used by the first switch for the second routing node as a destination to include a first number of entries in the forwarding table for the first port of the first switch based on the first total port weight, and a second number of entries in the forwarding table for the second port of the first switch based on the second total port weight, wherein the routing includes: receiving a packet, selecting one of the entries in the forwarding table based on one or more fields of the received packet, and forwarding the received packet via one of the ports of the first switch associated with the selected entry in the forwarding table.

In an example implementation, the determining a first inter-node weighted port group may include determining a first inter-node weighted port group that includes a first total port weight based on the first intra-node port weight multiplied by the first inter-node port weight and which is applied to a first port of the first switch and a second total port weight that includes the second intra-node port weight multiplied by the first inter-node port weight and which is applied to a second port of the first switch.

According to another general aspect, a computer program product is provided that includes a non-transitory computer-readable storage medium and storing executable code that, when executed by at least one data processing apparatus, is configured to cause the at least one data processing apparatus to perform a method inluding: determining a first set of intra-node port weights for a first switch of a first routing node, determining a set of inter-node port weights including a first inter-node port weight for routing traffic to a second routing node, determining a first inter-node weighted port group for the first switch for traffic directed to the second routing node, the first inter-node weighted port group including a first total port weight based on a first intra-node port weight and the first inter-node port weight and which is applied to a first port of the first switch, and a second total port weight based on a second intra-node port weight and the first inter-node port weight and which is applied to the second port of the first switch, and routing, by the first switch, traffic directed to the second routing node to one of a plurality of output ports of the first switch based on the first inter-node weighted port group.

In an example implementation of the computer program product, the determining a first inter-node weighted port group may include determining a first inter-node weighted port group that includes a first total port weight based on the first intra-node port weight multiplied by the first inter-node port weight and which is applied to a first port of the first switch and a second total port weight that includes the second intra-node port weight multiplied by the first inter-node port weight and which is applied to a second port of the first switch.

According to another general aspect, an apparatus is provided including at least one processor and at least one memory including computer instructions, when executed by the at least one processor, cause the apparatus to: determine a first set of intra-node port weights for a first switch of a first routing node, determine a set of inter-node port weights including a first inter-node port weight for routing traffic to a second routing node, determine a first inter-node weighted port group for the first switch for traffic directed to the second routing node, the first inter-node weighted port group including a first total port weight based on a first intra-node port weight and the first inter-node port weight and which is applied to a first port of the first switch, and a second total port weight based on a second intra-node port weight and the first inter-node port weight and which is applied to the second port of the first switch, and route, by the first switch, traffic directed to the second routing node to one of a plurality of output ports of the first switch based on the first inter-node weighted port group.

In an example implementation, each of the intra-node port weights of the first set of intra-node port weights being determined based on a total amount of bandwidth output from a respective next hop switch to the second routing node divided by a number of links from the first switch to the respective next hop switch.

According to another general aspect, an apparatus may include means for determining a first set of intra-node port weights for a first switch of a first routing node, means for determining a set of inter-node port weights including a first inter-node port weight for routing traffic to a second routing node, means for determining a first inter-node weighted port group for the first switch for traffic directed to the second routing node, the first inter-node weighted port group including a first total port weight based on a first intra-node port weight and the first inter-node port weight and which is applied to a first port of the first switch, and a second total port weight based on a second intra-node port weight and the first inter-node port weight and which is applied to the second port of the first switch, and means for routing, by the first switch, traffic directed to the second routing node to one of a plurality of output ports of the first switch based on the first inter-node weighted port group.

According to another general aspect, a method of routing traffic from a first routing node to either a second routing node or a third routing node may be provided, the first routing node being a multi-stage routing node that includes a first switch that is connected to at least a second switch via a first port and to a third switch via a second port. The method may include determining a first set of intra-node port weights for the first switch including a first intra-node port weight for routing traffic directed to the second routing node via the first port and the second switch, and a second intra-node port weight for routing traffic directed to the second routing node via the second port and the third switch, determining a set of inter-node port weights including a first inter-node port weight for routing traffic to the second routing node and a second inter-node port weight for routing traffic to the third routing node, determining a first inter-node weighted port group for the first switch for traffic directed to the second routing node, the first inter-node weighted port group including a first total port weight based on the first intra-node port weight and the first inter-node port weight and which is applied to the first port of the first switch, and a second total port weight based on the second intra-node port weight and the first inter-node port weight and which is applied to the second port of the first switch, and routing, by the first switch, traffic directed to the second routing node to either the second switch via the first port of the first switch based on the first total port weight or to the third switch via the second port of the first switch based on the second total port weight.

In an example implementation, the method may further include establishing a first tunnel from a source to a destination via the first routing node and the second routing node, and establishing a second tunnel from the source to the destination via the first routing node and the third routing node.

In an example implementation, the determining a first set of intra-node port weights may include determining the first set of intra-node port weights including a first intra-node port weight based on a first total amount of bandwidth between the second switch and the second routing node and a first number of links between the first switch and the second switch, and a second intra-node port weight based on a second total amount of bandwidth between the third switch and the second routing node and a second number of links between the first switch and the third switch.

In an example implementation, the determining a first set of intra-node port weights may include determining the first set of intra-node port weights including a first intra-node port weight that is determined as a first total amount of bandwidth between the second switch and the second routing node divided by a first number of links between the first switch and the second switch, and a second intra-node port weight that is determined as a second total amount of bandwidth between the third switch and the second routing node divided by a second number of links between the first switch and the third switch.

In an example implementation, the method may further include updating a forwarding table used by the first switch for the second routing node as a destination to include a first number of entries in the forwarding table for the first port of the first switch based on the first total port weight, and a second number of entries in the forwarding table for the second port of the first switch based on the second total port weight, wherein the routing includes: receiving a packet, selecting one of the entries in the forwarding table based on one or more fields of the received packet, and forwarding the received packet via one of the ports of the first switch associated with the selected entry in the forwarding table.

In an example implementation, the determining a first inter-node weighted port group may include determining a first inter-node weighted port group that includes a first total port weight based on the first intra-node port weight multiplied by the first inter-node port weight and which is applied to a first port of the first switch and a second total port weight that includes the second intra-node port weight multiplied by the first inter-node port weight and which is applied to a second port of the first switch.

In an example implementation, the method may further include determining a second set of intra-node port weights for the first switch including a third intra-node port weight for routing traffic directed to the third routing node via the first port and the second switch, and a fourth intra-node port weight for routing traffic directed to the third routing node via the second port and the third switch, and determining a second inter-node weighted port group for the first switch for traffic directed to the third routing node, the second inter-node weighted port group including a third total port weight based on the third intra-node port weight and the second inter-node port weight and which is applied to the first port of the first switch, and a fourth total port weight based on the fourth intra-node port weight and the second inter-node port weight and which is applied to the second port of the first switch, and routing, by the first switch, traffic directed to the third routing node to either the second switch via the first port of the first switch based on the third total port weight or to the third switch via the second port of the first switch based on the fourth total port weight.

In an example implementation, the determining the second set of intra-node port weights may include determining the second set of intra-node port weights including the third intra-node port weight that is determined as a third total amount of bandwidth between the second switch and the third routing node divided by a first number of links between the first switch and the second switch, and a second intra-node port weight that is determined as a fourth total amount of bandwidth between the third switch and the third routing node divided by a second number of links between the first switch and the third switch.

In an example implementation, the method further includes updating a forwarding table used by the first switch for the third routing node as a destination to include a third number of entries in the forwarding table for the first port of the first switch based on the third total port weight, and a fourth number of entries in the forwarding table for the second port of the first switch based on the fourth total port weight, wherein the routing includes: receiving a packet, determining a destination of the packet as the third routing node, selecting one of the entries in the forwarding table for the third routing node as a destination based on one or more fields of the received packet, forwarding the received packet via one of the ports of the first switch associated with the selected entry in the forwarding table.

According to another general aspect, an apparatus is provided for routing traffic from a first routing node to either a second routing node or a third routing node may be provided, the first routing node being a multi-stage routing node that includes a first switch that is connected to at least a second switch via a first port and to a third switch via a second port. The apparatus may include means for determining a first set of intra-node port weights for the first switch including a first intra-node port weight for routing traffic directed to the second routing node via the first port and the second switch, and a second intra-node port weight for routing traffic directed to the second routing node via the second port and the third switch, means for determining a set of inter-node port weights including a first inter-node port weight for routing traffic to the second routing node and a second inter-node port weight for routing traffic to the third routing node, means for determining a first inter-node weighted port group for the first switch for traffic directed to the second routing node, the first inter-node weighted port group including a first total port weight based on the first intra-node port weight and the first inter-node port weight and which is applied to the first port of the first switch, and a second total port weight based on the second intra-node port weight and the first inter-node port weight and which is applied to the second port of the first switch, and means for routing, by the first switch, traffic directed to the second routing node to either the second switch via the first port of the first switch based on the first total port weight or to the third switch via the second port of the first switch based on the second total port weight.

According to another general aspect a method is provided for routing traffic in a network that includes a first routing node that is connected to a second routing node and a third routing node, wherein the first routing node is a multi-stage routing node that includes a first stage of one or more switches including at least a first switch and a second stage of switches that includes at least a second switch and a third switch, each of the second switch and the third switch being coupled to the first switch, each of the second and third switches of the first routing node being connected to a plurality of adjacent routing nodes including at least the second routing node and the third routing node, the method including: determining a first number of links between the first switch and the second switch and a second number of links between the first switch and the third switch, determining a first total amount of bandwidth provided via one or more links between the second switch of the first routing node and the second routing node, and a second total amount of bandwidth provided via one or more links between the third switch of the first routing node and the second routing node, determining a first set of intra-node port weights for routing traffic directed to the second routing node via either a first port to the second switch or via a second port to third switch, the first set of intra-node port weights including a first intra-node port weight based on the first total amount of bandwidth and the first number of links and a second intra-node port weight based on the second total amount of bandwidth and the second number of links, and receiving, at the first switch, a set of inter-node port weights for routing traffic to either the second routing node or the third routing node, determining a first inter-node weighted port group that includes a first total port weight based on the first intra-node port weight and the first inter-node port weight and which is applied to a first port of the first switch, and a second total port weight based on the second intra-node port weight and the first inter-node port weight and which is applied to a second port of the first switch, and routing, by the first switch, traffic directed to the second routing node to either the second switch via the first port of the first switch based on the first total port weight or to the third switch via the second port of the first switch based on the second total port weight.

The method may further include updating a forwarding table used by the first switch for the second routing node as a destination to include a first number of entries in the forwarding table for the first port of the first switch based on the first total port weight, and a second number of entries in the forwarding table for the second port of the first switch based on the second total port weight, and the routing including: receiving a packet, selecting one of the entries in the forwarding table based on one or more fields of the received packet, and forwarding the received packet via one of the ports of the first switch associated with the selected entry in the forwarding table.

In an example implementation, the determining a first inter-node weighted port group may include: determining a first inter-node weighted port group that includes a first total port weight based on the first intra-node port weight multiplied by the first inter-node port weight and which is applied to a first port of the first switch, and a second total port weight that includes the second intra-node port weight multiplied by the first inter-node port weight and which is applied to a second port of the first switch.

In an example implementation, the method may further include determining a third total amount of bandwidth provided via one or more links between the second switch and the third routing node, and a fourth total amount of bandwidth provided via one or more links between the third switch and the third routing node, determining a second set of intra-node port weights for routing traffic directed to the third routing node via either a first port to the second switch or via a second port to third switch, the second set of intra-node port weights including a third intra-node port weight based on the third total amount of bandwidth and the first number of links and a fourth intra-node port weight based on the fourth total amount of bandwidth and the second number of links, determining a second inter-node weighted port group that includes a third total port weight based on the third intra-node port weight and the second inter-node port weight and which is applied to a first port of the first switch, and a fourth total port weight that includes the fourth intra-node port weight and the second inter-node port weight and which is applied to a second port of the first switch, and routing, by the first switch, traffic directed to the third routing node to either the second switch via the first port of the first switch based on the third total port weight or to the third switch via the second port of the first switch based on the fourth total port weight.

In an example implementation, the determining the second inter-node weighted port group may include: determining a second inter-node weighted port group that includes a third total port weight based on the third intra-node port weight multiplied by the second inter-node port weight and which is applied to a first port of the first switch, and a fourth total port weight that includes the fourth intra-node port weight multiplied by the second inter-node port weight and which is applied to the second port of the first switch.

According to another general aspect, an apparatus is provided for routing traffic in a network that includes a first routing node that is connected to a second routing node and a third routing node, wherein the first routing node is a multi-stage routing node that includes a first stage of one or more switches including at least a first switch and a second stage of switches that includes at least a second switch and a third switch, each of the second switch and the third switch being coupled to the first switch, each of the second and third switches of the first routing node being connected to a plurality of adjacent routing nodes including at least the second routing node and the third routing node. The apparatus may include means for determining a first number of links between the first switch and the second switch and a second number of links between the first switch and the third switch, means for determining a first total amount of bandwidth provided via one or more links between the second switch of the first routing node and the second routing node, and a second total amount of bandwidth provided via one or more links between the third switch of the first routing node and the second routing node, means for determining a first set of intra-node port weights for routing traffic directed to the second routing node via either a first port to the second switch or via a second port to third switch, the first set of intra-node port weights including a first intra-node port weight based on the first total amount of bandwidth and the first number of links and a second intra-node port weight based on the second total amount of bandwidth and the second number of links, and receiving, at the first switch, a set of inter-node port weights for routing traffic to either the second routing node or the third routing node, means for determining a first inter-node weighted port group that includes a first total port weight based on the first intra-node port weight and the first inter-node port weight and which is applied to a first port of the first switch, and a second total port weight based on the second intra-node port weight and the first inter-node port weight and which is applied to a second port of the first switch, and means for routing, by the first switch, traffic directed to the second routing node to either the second switch via the first port of the first switch based on the first total port weight or to the third switch via the second port of the first switch based on the second total port weight.

The details of one or more implementations are set forth in the accompanying drawings and the description below. Other features will be apparent from the description and drawings, and from the claims.

DETAILED DESCRIPTION

Figure 1:
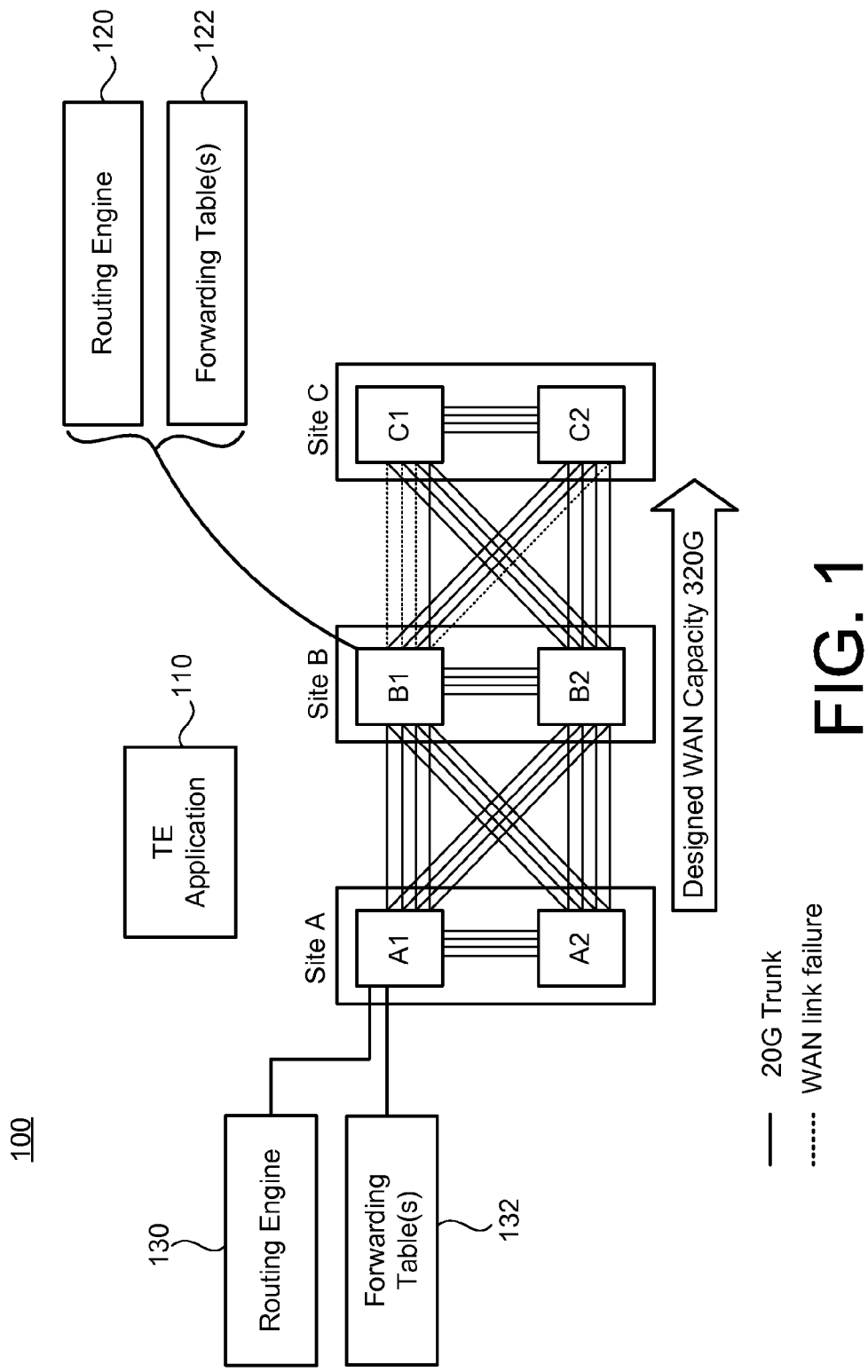
FIG. 1 is a block diagram illustrating a network according to an example implementation.

This document describes systems and techniques relating to routing, and in particular to a weighted cost multipath routing with intra-node and inter-node port weights.

According to an example implementation, a technique includes determining a first set of intra-node port weights for a first switch of a first routing node, determining a set of inter-node port weights including a first inter-node port weight for routing traffic to a second routing node, determining a first inter-node weighted port group for the first switch for traffic directed to the second routing node, the first inter-node weighted port group including a first total port weight based on a first intra-node port weight and the first inter-node port weight and which is applied to a first port of the first switch, and a second total port weight based on a second intra-node port weight and the first inter-node port weight and which is applied to the second port of the first switch. The technique may also include routing (or forwarding) traffic to an output/egress port of the first switch based on the first inter-node weighted port group.

According to another illustrative example implementation, a technique is provided for routing traffic from a first routing node (e.g., A1) to either a second routing node (e.g., B1) or a third routing node (e.g., B2). The first routing node may be a multi-stage routing node that includes a first switch (e.g., S2) that is connected to at least a second switch (e.g., S11) via a first port (e.g., port 1 of switch S2) and to a third switch (e.g., S12) via a second port (e.g., port 2 of switch S2). According to an example implementation, the technique may include determining a first set of intra-node port weights (e.g., W_p1, W_p2) for the first switch including a first intra-node port weight (W_p1) for routing traffic directed to the second routing node via the first port and the second switch, and a second intra-node port weight (W_p2) for routing traffic directed to the second routing node via the second port and the third switch. The technique may also include determining a set of inter-node port weights (e.g., W1, W2) including a first inter-node port weight (e.g., W1) for routing traffic to the second routing node and a second inter-node port weight (e.g., W2) for routing traffic to the third routing node. The technique may also include determining a first inter-node weighted port group (e.g., G1) for the first switch for traffic directed to the second routing node, the first inter-node weighted port group including a first total port weight (e.g., W_p1×W1) based on the first intra-node port weight and the first inter-node port weight and which is applied to the first port of the first switch, and a second total port weight (e.g., W_p2×W1) based on the second intra-node port weight and the first inter-node port weight and which is applied to the second port of the first switch. The technique may also include routing or forwarding, by the first switch, traffic directed to the second routing node to either the second switch via the first port of the first switch based on the first total port weight or to the third switch via the second port of the first switch based on the second total port weight.

FIG. 1 is a block diagram illustrating a network according to an example implementation. Network 100 may include a number of sites (e.g., different geographic locations or sites), such as sites A, B and C. Each site may include one or more routing blocks or routing nodes (e.g., routers) that are interconnected. For example, site A may include routing nodes A1 and A2 that are connected. Site B may include, for example, routing nodes B1 and B2 that are connected. While site C may include, for example, routing nodes C1 and C2, although any number and arrangement of routing nodes may be provided at each site. In an illustrative example, each line between routing nodes represents a 20 G (e.g., 20 Gb/s) WAN (Wide Area Network) communication link (or link), although this is merely an example, and each link may provide a higher or lower bandwidth or data rate, and each link may provide a different bandwidth or data rate than the other links, for example. The term bandwidth will be used to mean bandwidth and/or data rate capacity for a link or set of links. In the example network shown in FIG. 1, a solid line may indicate an operational WAN link, while a dashed line may indicate an occurrence of a WAN link failure. Therefore, in the absence of a link failure, each routing node may receive up to 160 Gb/s of input data via 8 links and may output up to 160 Gb/s via 8 links. For example, routing node B1 may receive as inputs, for example, up to 80 Gb/s of data input via 4 links from routing node A1 and up to 80 Gb/s of data input via 4 links from routing node A2. Routing node B1 may also output up to 80 Gb/s of data (traffic) via 4 links to C1 and output up to 80 Gb/s of data via 4 links to C2, when all links are operating correctly. Also, there may be, for example, 80 Gb/s of bandwidth available via 4 links provided between each routing node within a site. For example, routing nodes A1 and A2 at site A may be connected via four 20 Gb/s links, to provide a total interconnection data rate or bandwidth of up to 80 Gb/s between A1 and A2. Routing nodes B1 and B2, and routing nodes C1 and C2 may include a similar interconnection of four 20 Gb/s links, in this illustrative example. The network shown in FIG. 1 is merely an example, and any number and/or arrangement of sites, routing nodes, links and link bandwidths or data rates may be provided.

Also, referring to FIG. 1, routing node B1 may include, for example, a routing engine 120 and one or more forwarding tables 122. Routing engine 120 may, for example, have access to local network information specific to routing node B1, such as knowledge of connections to adjacent routing nodes (e.g., routing nodes B2, C1, C2, A1, and A2) that are connected to routing node B1, the number and data rate or bandwidth of links between B1 and other/adjacent routing nodes. Routing engine 120 may determine one or more port weights for routing node B1, such as intra-node port weights, and may update the one or more forwarding tables 122 based on these port weights, for example. Similarly, a routing engine 130 and one or more forwarding tables 132 are provided for routing node A1 and any switches that may be part of routing node A1. Routing engine 130 may determine one or more port weights for routing node A1, such as intra-node port weights, and may update the one or more forwarding tables 132 based on these port weights, for example. Each of the other routing nodes may similarly include a routing engine and one or more forwarding tables.

Also, network 100 may include a traffic engineering application 110, which may be located on a server, computer, central controller for the network 100, or on a routing node or router, for example. The traffic engineering application 110 may detect and/or keep track of the global WAN topology within network 100, including the routing nodes, the sites of each routing node, the interconnection (e.g., including number and data rate/bandwidth of links) between the different routing nodes within network 100, which links have failed. Traffic engineering application 110 may also receive messages from each routing node that indicates its site or location, connections and numbers of links to other routing nodes, and/or traffic congestion information that may indicate an occurrence of traffic congestion and/or link failure on one or more ports for each routing node. Traffic engineering application 110 may also establish one or more tunnels, or pre-established paths, for transmitting data or traffic (e.g., to transmit a flow of packets) from a source to a destination via or across a predefined path that includes one or more routing nodes, for example. Also, as described in greater detail below, based on the WAN topology of network 100, traffic congestion information for one or more routing nodes and/or other network/WAN related information received or determined by the traffic engineering application 110, the traffic engineering application 110 may determine inter-node port weights for each routing node that may be used, for example, to allocate or weight traffic or packets directed to a particular destination among a plurality of egress ports at a routing node.

In addition, as described in greater detail below, according to one example implementation, one or more of the routing nodes may each be a multi-stage routing node that may include one or more stages of switches (or network switching devices), with each stage including one or more switches. For example, each routing node may be a two-stage CLOS network fabric of network switching elements (or CLOS network of switches). In one example implementation, a routing engine 120 may be provided for each switch, or a single routing engine 120 at a routing node may be provided for all switches of that routing node. Also, each switch may include one or more forwarding tables, e.g., which may be updated by the routing engine 120. This is merely one illustrative implementation, and others may be used.

As shown in FIG. 1, according to one example, a link failure (shown by dashed lines) may occur on several links, such as a failure on three of the four links from routing node B1 to routing node C1, and on one of the four links from routing node B1 to routing node C2. Therefore, the example link failures shown in FIG. 1 may, in some cases, for example, result in an asymmetric capacity or bandwidth in the routing nodes of the network 100. For example, routing node B1 may only have 80 Gb/s of output bandwidth, while routing node B2 may have 160 Gb/s of output bandwidth. In some cases of an asymmetric WAN (wide area network) link failure, such as the example shown in FIG. 1, some routing control systems may throttle or limit the throughput of multiple routing nodes, including those routing nodes that that have no link failures. For example, in the case of an equal cost multi-path (ECMP) routing, the routing control system (or bandwidth enforcer) may limit the bandwidth or data rate through the site over the affected links so as to equally share the bandwidth or data rate loss across both (or all) routing nodes at a site. In the example shown in FIG. 1, a bandwidth enforcer for ECMP routing may, as an illustrative example, throttle or reduce the data rate or bandwidth for output by B2 to 80 Mb/s (e.g., to match the maximum bandwidth or data rate output by B1 of 80 Mb/s), even though B2 has a higher bandwidth of 160 Mb/s, for example.

Therefore, according to an example implementation, port weights, including intra-node port weights and/or inter-node port weights may be used for (or applied to) one or more switches (or switch elements) of each routing node, e.g., route and/or allocate traffic among the available egress ports of the switch to make more effective use of available bandwidth or data rate at each routing node, such as, for example, even in the case of one or more WAN link failures.

Figure 2:
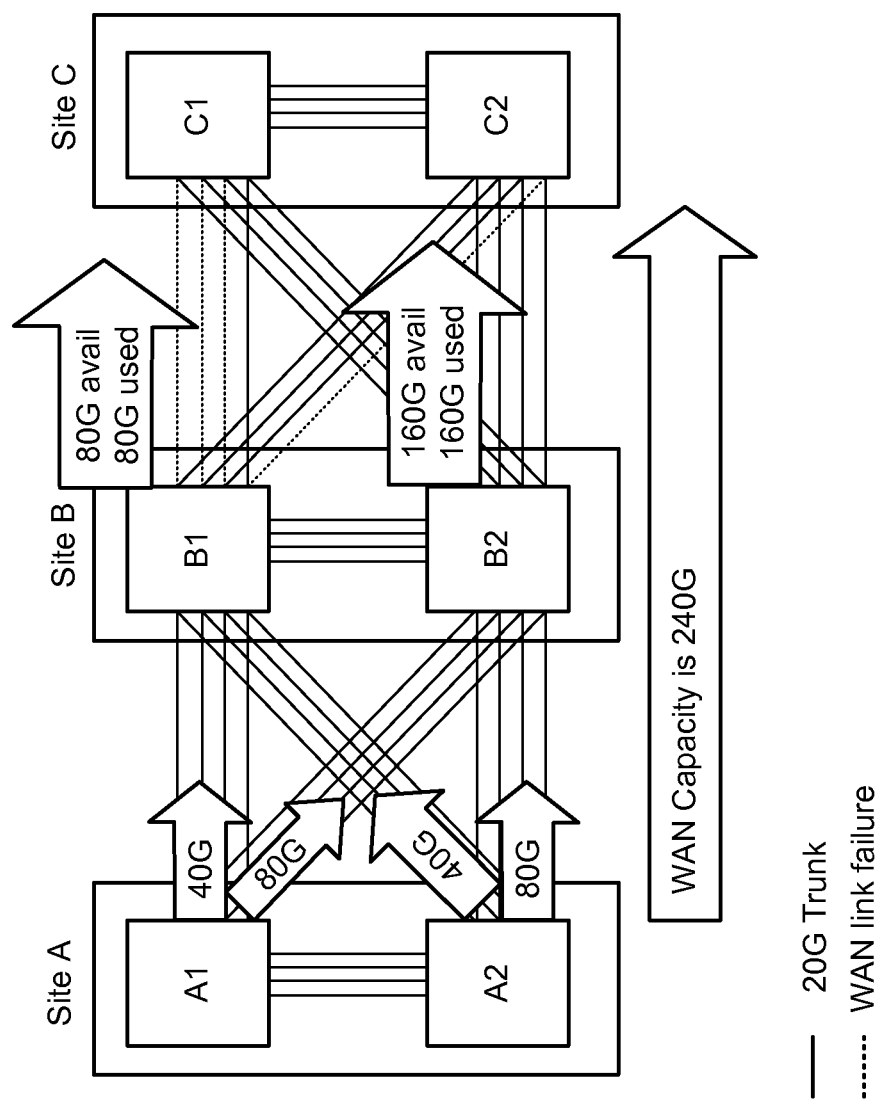
FIG. 2 is a diagram illustrating a use of available bandwidth according to an example implementation.

FIG. 2 is a diagram illustrating a more effective use of available bandwidth according to an example implementation. In the example shown in FIG. 2, four links out of eight links have failed resulting in only 80 Gb/s of output bandwidth or capacity for B1. In this example, one or more port weights may be provided such that B1 more effectively uses its 80 Gb/s bandwidth or data rate capacity, while the other routing node(s) at site B may use up to their capacity, e.g., routing node B2 may use up to 160 Gb/s of the 160 Gb/s available bandwidth. Therefore, at least in some cases, in this manner, each routing node may operate at a higher utilization of available bandwidth/data rate.

Figure 3:
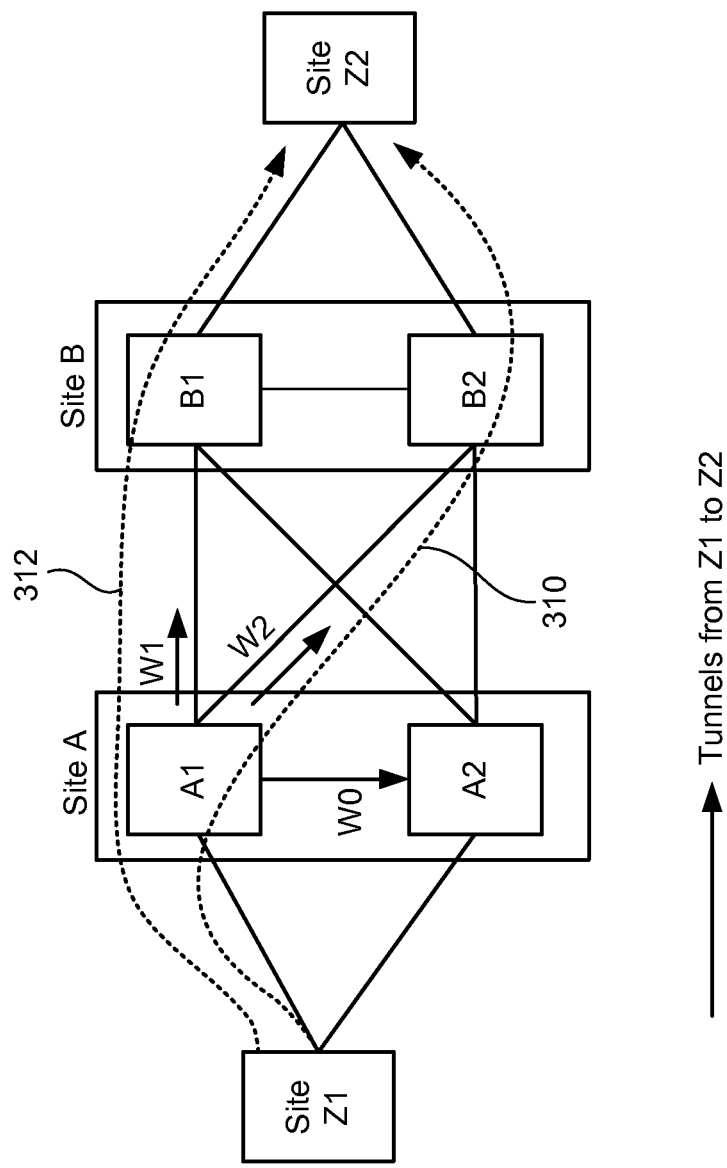
FIG. 3 is a diagram illustrating tunnels (or pre-established network paths) according to an illustrative example.

FIG. 3 is a diagram illustrating tunnels (or pre-established network paths) according to an illustrative example. In the example shown in FIG. 3, a first tunnel 310 (or a first predetermined network path) is established by traffic engine application 110 from site Z1 (or source) to size Z2 (or destination) via routing node A1 and routing node B2. A second tunnel 312 (or second predetermined network path) is established by traffic engine application 110 from site Z1 (or source) to size Z2 (or destination) via routing node A1 and routing node B1. Therefore, in this example, inter-node weights and/or intra-node weights may be applied by routing node A1 to allocate traffic to a first port to routing node B1, and via a second port to routing node B2. For example, a forward table(s) used by one or more switches at routing node A1 may include a number of table entries based at least in part on a first weight W1 applied to the first port and a second weight W2 that is applied to a second port of routing node A1. This is merely one example, and other network configurations may be provided.

For example, as shown in FIG. 3 port weights may be provided, including W0, W1, and W2. In an illustrative example, W1 may be the port weight applied to traffic sent to routing node B1; W2 may be the port weight applied to traffic sent to routing node B2; And, port weight W0 may be the port weight applied to the side link from routing node A1 to A2 (for traffic sent from A1 to A2), within site A.

Figure 4:
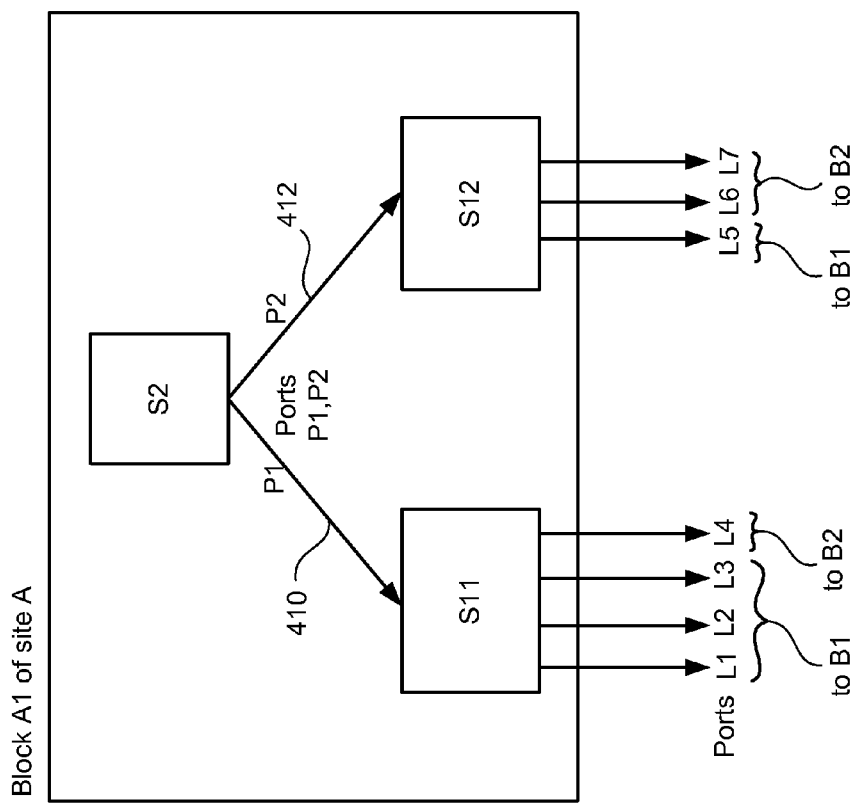
FIG. 4 is a diagram illustrating an example implementation of routing node A1.

FIG. 4 is a diagram illustrating an example implementation of routing node A1. In the illustrative example shown in FIG. 4, routing node A1 may include multiple stages of switches. In this example, only two stages are shown, but any number of stages of switches may be used. Each stage of switches within routing node A1 may include one or more switches. For example, a first stage of one or more switches may include switch S2 (e.g., a first switch), and a second stage of switches may include switches S11 (e.g., a second switch) and S12 (e.g., a third switch). According to an example implementation, each first stage switch may be connected to one or more second stage switches, and each second stage switch may be connected to one or more first stage switches. A first link 410 may connect port 1 (P1) of switch S2 to a port of switch S11. Similarly, a second link 412 may connect port 2 (P2) of switch S2 to a port of switch S12. While only one first stage switch (S2) and two second stage switches (S11, S12) are provided for this example of routing node A1, a routing node may include any number of switches at each stage, and may be interconnected in a variety of different manners. With respect to switch S2, switches S11 and S12 may be referred to as next hop switches. Also, the terms first stage and second stage may be a notation. Therefore, for example, in another example implementation, switch S2 may be referred to as a second stage switch, and a first stage of switches may include switches S11 and S12, for example.

While only one link connects switch S2 to each of switches S11 and S12, any number of links may be provided between switch S2 and each of switches S11 and S12. Also, an uneven or unequal number of links may connect switch S2 to switches S11 and S12. For example, a first number of links may connect switch S2 to switch S11, while a second number of links (which may be different from the first number of links) may connect switch S2 to switch S12. In the illustrative example shown in FIG. 4, egress ports L1, L2 and L3 of switch S11 are connected to routing node B1, while egress port L4 of switch S11 is connected to routing node B2. Port L5 of switch S12 is connected to routing node B1, while ports L6 and L7 of switch S12 are connected to routing node B2, as shown in FIG. 4. Also, in this example, ports L1-L7 may also be considered as egress ports of routing node A1. This is merely an example, and any number of links may connect each of edge switches (provided at the edge of routing node A1) S11, S12 to each of next routing nodes B1 and B2. However, as can be seen in the illustrative example of FIG. 4, both switches S11 and S12 may be connected to each of routing nodes B1 and B2.

Example implementations will now be described for determining port weights and weighted port groups for one or more switches within a routing node. First, the routing engine 130 for a first routing node A1 may determine a set of intra-node port weights for first switch S2 (for example) for routing traffic directed to a second routing node (e.g., B1). A number of intermediate calculations or determinations may be performed in order to determine a set of intra-node port weights for switch S2 for routing traffic to directed to routing node B1.

TABLE 1

Output Bandwidth for switches S11, S12

| node | Destination | Bandwidth (or Number of links) |
|---|---|---|
| S11 | B1 | BW_s11_B1 = 3 |
| S11 | B2 | BW_s11_B2 = 1 |
| S12 | B1 | BW_s12_B1 = 1 |
| S12 | B2 | BW_s12_B2 = 2 |

As shown in Table 1 above, the total output (egress) bandwidth for each of the second stage switches (S11, S12) is determined with respect to each of the next hop routing nodes (e.g., with respect to routing nodes B1 and B2). In this example, it is assumed that each output link from switch S11 or S12 to either routing node B1 or routing node B2 has the same bandwidth or data rate, although in general, links may have different bandwidths. Each row of Table 1 identifies the second stage node (either S11 or S12), the destination routing node (either B1 or B2), and a total bandwidth. The first row indicates that BW_s11_B1=3, which means that the total amount of bandwidth (on the links) from switch S11 to routing node B1 is 3 (e.g., 3 units of BW, since there are 3 links from switch S11 to B1). Similarly, Table 1 indicates: BW_s11_B2=1, which means that the total amount of bandwidth from switch S11 to routing node B2 is 1 unit of bandwidth or 1 link; BW_s12_B1=1, which means that the total amount of bandwidth from switch S12 to routing node B1 is 1 unit of bandwidth or 1 link; and BW_s12_B2=2, which means that the total amount of bandwidth from switch S12 to routing node B2 is 2 units of bandwidth or 2 links, for example. In this illustrative example, the total amount of output bandwidth from a switch (e.g., S11 or S12) to a particular destination routing node (e.g., B1 or B2) may be determined based on the total number of links connected to egress ports of the specific switch that connect to the destination routing node of interest, because all of the links have the same bandwidth in this example. Although, in general, various links may have different bandwidths.

Also, in this example, switch S2 includes two egress ports, including port P1 that is connected to switch S11 and port P2 which is connected to switch S12 (see FIG. 4).

Also, the following ratio may be defined: N_s11:N_s12, where N_s1$i$ is the number of links from switch S2 to switch S1$i$. Thus, for example, N_s11=1 (1 link from switch S2 to switch S11), and N_s12=1 (1 link from switch S2 to switch S12).

A first set of intra-node port weights (W_p1, W_p2), for switch S2, for routing node B1 as a destination, may be determined, for example, as a ratio of a second hop bandwidth (bandwidth output from next hop switch S11 or S12 to routing node B1) per first hop link (based on a number of links from switch S2 to the respective next hop switch S11 or S12). Therefore, for example, intra-node port weights may be determined as or based on a ratio of bandwidth output from next hop switch (S11 or S12) to routing node B1 divided by a number of links from switch S2 to the respective next hop switch (S11 or S12). Thus, in an example implementation that may be illustrative, the first set of intra-node port weights may be determined by routing engine 130, for example, as follows for switch S2 (of routing node A1) for routing node B1 as a destination:

W_p1 (first intra-node port weight)=BW_s11_B1/N_s11=3/1=3, which means, for example, that the first intra-node port weight (W_p1) may be determined or calculated as the total amount of bandwidth (on the links) from switch S11 to routing node B1 divided by the number of links from switch S2 to switch S11.

W_p2 (second intra-node port weight)=BW_s12_B1/N_s11=1/1, which means, for example, that the second intra-node port weight (W_p2) may be determined or calculated as the total amount of bandwidth (on the links) from switch S12 to routing node B1 divided by the number of links from switch S2 to switch S11.

And, routing engine 130 for routing node A1 may also determine a first routing engine weighted cost multipath (WCMP) group G1 (which may also be referred to as a first intra-node weighted port group) for switch S2 for routing node B1 as a destination, as follows: G1={P1×W_p1, P2×W_p2}={P1×3, P2}.

Similar to the determination or calculation of the first intra-node weighted port group G1, routing engine 130 may determine a second routing engine weighted cost multipath (WCMP) group G2 (which may also be referred to as a second intra-node weighted port group) for switch S2 for routing node B2 as a destination, based on the following operations. These operations include determining or calculating a second set of intra-node port weights (including W_p3, W_p4), and then determining a second routing engine weighted cost multipath (WCMP) group G2 (which may also be referred to as a second intra-node weighted port group) for switch S2 for routing node B2 as a destination.

N_s11=1 (1 link from switch S2 to switch S11), and N_s12=1 (1 link from switch S2 to switch S12).

Table 1 indicates: BW_s11_B2=1, which means that the total amount of bandwidth from switch S11 to routing node B2 is 1 unit of bandwidth or 1 link; And, BW_s12_B2=2, which means that the total amount of bandwidth from switch S12 to routing node B2 is 2 units of bandwidth or 2 links, for example.

W_p3 (a third intra-node port weight)=BW_s11_B2/N_s11=1/1=1, which means, for example, that third first intra-node port weight (W_p3) may be determined or calculated as the total amount of bandwidth (on the links) from switch S11 to routing node B2 divided by the number of links from switch S2 to switch S11.

W_p4 (a fourth intra-node port weight)=BW_s12_B2/N_s12=2/1=2, which means, for example, that the fourth intra-node port weight (W_p4) may be determined or calculated as the total amount of bandwidth (on the links) from switch S12 to routing node B2 divided by the number of links from switch S2 to switch S12.

And, routing engine 130 for routing node A1 may also determine the second routing engine weighted cost multipath (WCMP) group G2 (which may also be referred to as a second intra-node weighted port group) for switch S2 for routing node B2 as a destination, as follows: G2={P1×W_p3, P2×W_p4}={P1, P2×2}, where P1 and P2 are the first and second ports, respectively, of switch S2.

Next, a set (or plurality) of inter-node port weights (e.g., W1, W2) may be determined or received. For example, with respect to routing node A1, a first inter-node port weight (W1) may be used or applied in a forwarding table for switch S2 to route or forward traffic to a second routing node (e.g., routing node B1), and a second inter-node port weight (W2) may be used or applied in a forwarding table for switch S2 to route or forward traffic to a third routing node (e.g., routing node B2). The inter-node port weights (W1, W2) may, for example, be determined by traffic engineering application 110 based on a variety of different factors or criteria.

The traffic engineering application 110 may detect and/or keep track of the global WAN topology within network 100, including the routing nodes, the sites of each routing node, the interconnection (e.g., including number and data rate/bandwidth of links) between the different routing nodes within network 100, which links have failed, and/or congestion on one or more ports or links within the network 100 (FIG. 1). The traffic engineering application 110 may determine inter-node port weights for each routing node that may be used, for example, to allocate or weight traffic, packets or flows (e.g., packets having some common characteristics such as a common source address and destination address and source and destination port numbers) directed to a particular destination among a plurality of egress ports at a switch or routing node. Thus, the traffic engineering application 110 may determine, and may periodically update, inter-node port weights for one or more, or even all, of the switches and/or routing nodes within network 100. A variety of different algorithms may be used to determine inter-node port weights, such as a least cost routing algorithm in which a least cost (e.g., fewest number of hops) may be weighted more heavily, or a weighted cost multipath routing algorithm, e.g., in which multiple least (or lower) cost paths may be weighted more heavily than higher cost paths. Of course, variations may be applied, for example, to avoid failed links, or to send less traffic on congested links, etc.

In an example implementation, traffic engineering application 110 may determine inter-node port weights, e.g., based on global WAN conditions (e.g., congestion, number of hops or routing nodes between source and destination, detection of failed links), the traffic engineering application may determine and then forward to routing node A1 (and all switches therein, including switches S2, S11 and S12) the inter-node port weights (W1, W2). For example, the traffic engineering application 110 has knowledge of the various link or trunk bandwidths or capacities, link congestion and/or failures within network 100, and can set up various tunnels or predetermined paths across network 100 between a source and destination, and may balance traffic across multiple paths or among multiple tunnels between a source and a destination using one or more approaches, such as lowest cost, non-shortest path. In this manner, the traffic engineering application 110 may generate inter-node port weights W1, W2, which may be used to combine the intra-node weighted port groups G1, G2 in a weighted manner based on the inter-node port weights W1, W2.

Next, a traffic engineering weighted cost multipath (WCMP) group (which may also be referred to as an inter-node weighted port group) may be determined for switch S2. The inter-node weighted port group for switch S2 may be determined by traffic engineering application 110, or by routing engine 130 (e.g., after routing engine receives the inter-node port weights W1, W2 from traffic engineering application 110).

The traffic engineering WCMP group or inter-node weighted port group for switch S2 may be determined, for example, as: {G1×W1, G2×W2}, which means that that the inter-node weighted port group for switch S2 may be determined as: the first inter-node port weight (W1) applied to (or multiplied by) the first intra-node weighted port group for switch S2 (G1), and second inter-node port weight (W2) applied to (or multiplied by) the second intra-node weighted port group for switch S2 (G2). Substituting for G1 and G2, where G1={P1×3, P2}, G2={P1, P2×2}, the traffic engineering WCMP group (or inter-node weighted port group) for switch S2 may be defined or determined as:

{W1×G1}=W1×{P1×3, P2} (for B1 as traffic destination), and

{W2×G2}=W2×{P1, P2×2} (for B2 as the traffic destination).

The W1×G1, and W2×G2 may be a hierarchical group. Therefore, according to an example implementation, the inter-node port weights and intra-node port weights are multiplied together to provide respective total port weight (s). For example, for B1 as a destination, a first total port weight may be calculated as the product of the first inter-node port weight (W1) (W1 is associated with B1 as a traffic destination) and the first intra-node port weight (W_p1), as follows: first total port weight=W1×W_p1=(W1×3), which is applied to port P1 of switch S2, for traffic directed to routing node B1. Similarly, a second total port weight may be calculated or determined as W1×W_p2=W1×1, which is applied to port P2 of switch S2, for traffic directed to routing node B1.

Similarly, for traffic directed to routing node B2, a third total port weight may be calculated as the product of the second inter-node port weight (W2) (associated with B2 as a destination) and the third intra-node port weight (W_p3) =W2×W_p3=W2×1, which is applied to port P1 of switch S2 for traffic directed to routing node B2. Likewise, a fourth total port weight may be calculated as the product of the second inter-node port weight (associated with B2 as a destination) as W2×W_p4=is applied to port P2 of switch S2.

According to an example implementation, port weights (such as total port weights) may be applied to ports by varying or adjusting a number of entries in a forwarding table(s) for the port based on the associated port weight. For example, a number of entries in a forwarding table for each port may be provided (or adjusted) based upon the relative port weights applied to each port. For example, a ratio of port weights, such as the total port weights may be used to determine a number of entries to be provided for each port in a forwarding table for a switch or routing node. For example, a port weight (e.g., total port weight) of 3 for a first port, and a port weight of 1 for a second port may be implemented within a forwarding table for a switch by providing 3 entries in the forwarding table for the first port for every 1 entry in the forwarding table for the second port. Thus, the relative port weights for a destination for the different ports may be used to define or determine a number of entries in the forwarding table for each port, according to an example implementation of port weights.

According to one example implementation, a forwarding table for each destination (e.g., for each destination of routing nodes B1, B2, . . . ) may be provided for (or at) each switch or routing node within a network, e.g., with a number of entries being provided in the forwarding table based on the port weights (e.g., more entries in a forwarding table based on a higher port weight, and fewer entries in forwarding table based on a lower port weight). According to an example implementation, a packet may be received by a switch or routing node, and the packet may include several fields. A hash function may be performed by a switch or routing node on one or more fields (e.g., a 5-tuple of source IP address, destination IP address, source port and destination port and protocol type) for each received packet to determine a port for forwarding the packet. The resulting hash for the received packet may be used to perform a lookup into the forwarding table to select one of N entries of the forwarding table to identify an egress port for forwarding the packet. Each entry in the forwarding table identifies a port (egress port for forwarding the packet). A forwarding table may be provided for each destination, and there may be multiple entries in a forwarding table, where each entry corresponds to an egress port, for example. A hash function may be used to select one of N entries of a forwarding table. One example purpose of a hash function may be to pseudo-randomly select an egress port for a flow of packets. This routing technique may be used for multi-path routing.

For example, based on one or more port weights, one or more entries for a port may be added (e.g., if the port weight is increased, or is larger than the port weights for other ports) to a forwarding table to increase a likelihood that such port will be selected for forwarding a packet or flow. Similarly, one or more entries for a port may be removed or deleted from a forwarding table (e.g., if a port weight for a port decreases or is less than the port weight for other ports) to decrease a likelihood that such port will be selected for forwarding the packet or flow. The port weights (e.g., total port weights) may be used by the routing engine to select or adjust a number of entries in a forwarding table(s) for each port at a switch for a destination.

For example, if a first total port weight=4 is applied to port P1, and a second total port weight=2 is applied port P2 for B1 as a destination, then the forwarding table at the switch for B1 as a destination may include, for example, four entries for port P1, and two entries for port P2, or may include two entries for port P1 and one entry for port P2. The ratio of port weights between ports may be applied to respective ports. In this example, the ratio of first total port weight/second total port weight=4/2=2. In this example, it may be the ratio of entries for each port in the table that may be implemented, based on the ratio of port weights. The switch, or routing node, may perform a hash function on one or more fields of each received packet or flow to select one of the entries of the forwarding table, in order to select an egress port for forwarding the packet, according to an example implementation.

Note, hardware or a switch or routing node may only have a equal cost multipath (ECMP) table, and the weighted cost multi-path (WCMP) group, or the inter-node port group, can be stored as a ECMP group by duplicating (e.g., adding or removing) entries at different times to reflect their individual port weights. For instance, G2={P1, P2×2} can be stored as {P1, P2, P2} in a hardware ECMP table (forwarding table). Thus, in such a forwarding table, there would be one entry for port P1, and two entries for port P2, since the weight applied to port P1 is 1, and the weight applied to port P2 is 2, in this example.

If a hierarchical group is not supported, or if the routing node or switch is not capable of determining or implementing the inter-node weighted port groups as noted above, then the routing engine 110 and/or traffic engineering application 130 may construct or determine a flat group for the weighted inter-node port group as follows:

First, each intra-node port group is expanded to a same least common multiple (LCM) size and then taking the weighted sum of all expanded intra-node weighted port groups based on inter-node weights (W1, W2).

N1=size(G1)=4 (where 4 is the size of G1=the total number of port entries for both ports for G1, which is the first intra-node weighted port group).

N2=size(G2)=3 (where 3 is the size of G2=the total number of port entries for both ports for G2, which is the second intra-node weighted port group).

Next a least common multiple of N1 and N2 is determined, as LCM(N1, N2)=12.

Flat weighted inter-node port group={G1×LCM/N1× W1+G2×LCM/N2×W2}
={G1×3×W1+G2×4×W2}
={P1×(9×W1+4×W2), P2×(3×W1+8×W2)}

This is a traffic engineering group, by duplicating entries at different times, it can split traffic towards S11 and S12 nodes into specific ratio as provided by inter-node weights W1, W2. The drawback is the large amount of ECMP table entries that may be consumed to provide duplicate entries in a forwarding table based on the total port weights.

While only one S2 switch is shown in FIG. 4, there may be multiple (or a plurality) of S2 switches (or S2 level switches) within each or one or more of the routing nodes. And, a set of intra-node port weights, a set of inter-node port weights, and a set of total port weights may be calculated or determined for each S2 level switch, for example. Thus, a different or separate inter-node weighted port group may be determined separately or independently for each S2 switch, e.g., separately from the other S2 switches (or S2 level switches).

Next, a routing engine equal cost multipath (ECMP) port groups, or an ECMP intra-node port group, may be determined or calculated for switches S11, S12, for example, as follows:

The following is a list of ports used to forward traffic from switch S11 directed to routing node B1:

S11→B1 traffic, G_s11_B1={L1, L2, L3}

The following is a list of ports used to forward traffic from switch S11 directed to routing node B2:

S11→B2 traffic, G_s11_B2={L4}

The following is a list of ports used to forward traffic from switch S12 directed to routing node B1:

S12→B1 traffic, G_s12_B1={L5}

The following is a list of ports used to forward traffic from switch S12 directed to routing node B2:

S12→B2 traffic, G_s12_B2={L6, L7} According to an example implementation, these are disjoint (or non-overlapping) groups of ports, and are shown in FIG. 4.

Next, a traffic engineering weighted cost multipath (WCMP) group (which may also be referred to as an inter-node weighted port group) may be determined for switches S11 and S12. The inter-node weighted port groups for switches S11 and S12 may be determined by traffic engineering application 110, or by routing engine 130 (e.g., after routing engine receives the inter-node port weights W1, W2 from traffic engineering application 110).

The traffic engineering WCMP group or inter-node weighted port group for switches S11 and/or S12 may be determined, for example, as:

Hierarchical group: inter-node weighted port group for switches S11 and S12:

G_TE_S11_hierarchical={G_s11_B1×W1, G_s11_B2× W2}

G_TE_S12_hierarchical={G_s12_B1×W1, G_s12_B2× W2}

Thus, the inter-node weighted port groups for S11 and S12 may be determined based on the ECMP port groups for S11 and S12, for both destination of B1 and B2, and the inter-node weights W1 and W2. The port weights W1, W2 may be applied to the ports L1-L7 output from S11 and S12, per the inter-node weighted port group for switches S11 and S12 shown above. For example, weights may be applied to ports by adjusting the number of entries in a forwarding table(s) based on (e.g., to correspond to) the port weights for each port.

Flat group: inter-node weighted port group for switches S11 and S12:

N1=size(G1)=4
N2=size(G2)=3
LCM(N1, N2)=12, which is the least common multiple of N1, N2.

For switch S11, the flat inter-node weighted port group may be determined, for example, as: G_TE_S11_flat={G_s11_B1×LCM/N1×W1+G_s11_B2× LCM/N2×W2}={G_s11_B1×3×W1+G_s11_B2×4×W2}
={L1×3×W1, L2×3×W1, L3×3×W1, L4×4×W2}

Similarly, for switch S12, the flat inter-node weighted port group may be determined, for example, as: G_TE_S12 flat={G_s12_B1×LCM/N1×W1, G_s12_B2×LCM/N2× W2}={L5×3×W1, L6×4×W2, L7×4×W2}

Verification: This result may be verified. For example, when a total tunneled traffic of (9×W1+4×W2)+(3×W1+8× W2)=12×(W1+W2) is sent to routing node A1, switch S2 sends (9×W1+4×W2) traffic to switch S11, and the other (3×W1+8×W2) traffic to switch S12 based on switch S2's G_TE_S2_flat group.

Likewise, on switch S11, (9×W1) traffic is sent to routing node B1, and the other (4×W2) traffic is sent to routing node B2 based on switch S11's G_TE_S11_flat group.

On switch S12, (3×W1) traffic is sent to routing node B1, and the other (8×W2) traffic is sent to B2 block based on S12's G_TE_S12 flat group.

Effectively, (12×W1) transit traffic is forwarded or transmitted to routing node B1 and (12×W2) transit traffic is forwarded or transmitted to routing node B2, thereby achieving the desired specific splitting ratio of W1:W2 (based on inter-node port weights, W1, W2, for example).

In the above example implementations, the paths from switch S2 to switches S11 and S12 each include only one link, or a homogeneous topology. However, a heterogeneous internal topology may be provided as well, e.g., which may include a different number of links and/or a different bandwidth between switch S2 to each of switches S11 and S12. For example, the above example implementations are not limited to homogeneous inter-fabric topology. Thus, according to another illustrative example implementation, a S2 switch may have different bandwidth (or number of links) towards S11 and S12 switches, e.g., due to either asymmetric striping or link failures. Therefore, according to an example implementation, ports P1 and P2 of switch S2 may be connected switch S11, while port P3 of switch S2 may be connected to switch S12. Therefore, in this example, there are two ports (and two links) connected from switch S2 to switch S22, and one port (and one link) from switch S2 to switch S12.

Therefore, according to an example implementation, routing engine 130 may determine 1) a first routing engine weighted cost multipath (WCMP) group G1 (which may also be referred to as a first intra-node weighted port group) for switch S2 for routing node B1 as a destination, and 2) a second routing engine weighted cost multipath (WCMP) group G2 (which may also be referred to as a second intra-node weighted port group) for switch S2 for routing node B2 as a destination, e.g., based on the following operations.

Determining a first intra-node weighted port group G1:
Nexthop switches: S11, S12
S2 egress ports to nexthop nodes:
ports P1, P2 to switch S11, port P3 to switch S12 (note the heterogeneous structure in this example).
N_s11:N_s12=2:1 (N_s1$i$–number of links from node S2 to node S1$i$)
Weights for nexthop nodes: W_s11:W_s12=BW_s11_B1: BW_s12_B1=3:1
Weights for nexthop entries (each entry corresponds to an egress port):
W_p1:W_p2:W_p3=W_s11/N_s11:W_s11/N_s11: W_s12/N_s12=3:3:2
First intra-node weighted port group G1={P1×W_p1, P2×W_p2, P3×W_p3}={P1×3, P2×3, P3×2}.
Similarly, the second intra-node weighted port group G2 may be determined for switch S2 node for sending traffic to routing node B2, as follows:
G2={P1×W_p1, P2×W_p2, P3×W_p3}={P1, P2, P3×4}
As noted above, the inter-node weighted port groups may be determined by multiplying the intra-node weighted port groups G1, G2 by the respective inter-node weights, as follows:
Inter-node weighted port group=G1×W1, G2×W2.

Figure 5:
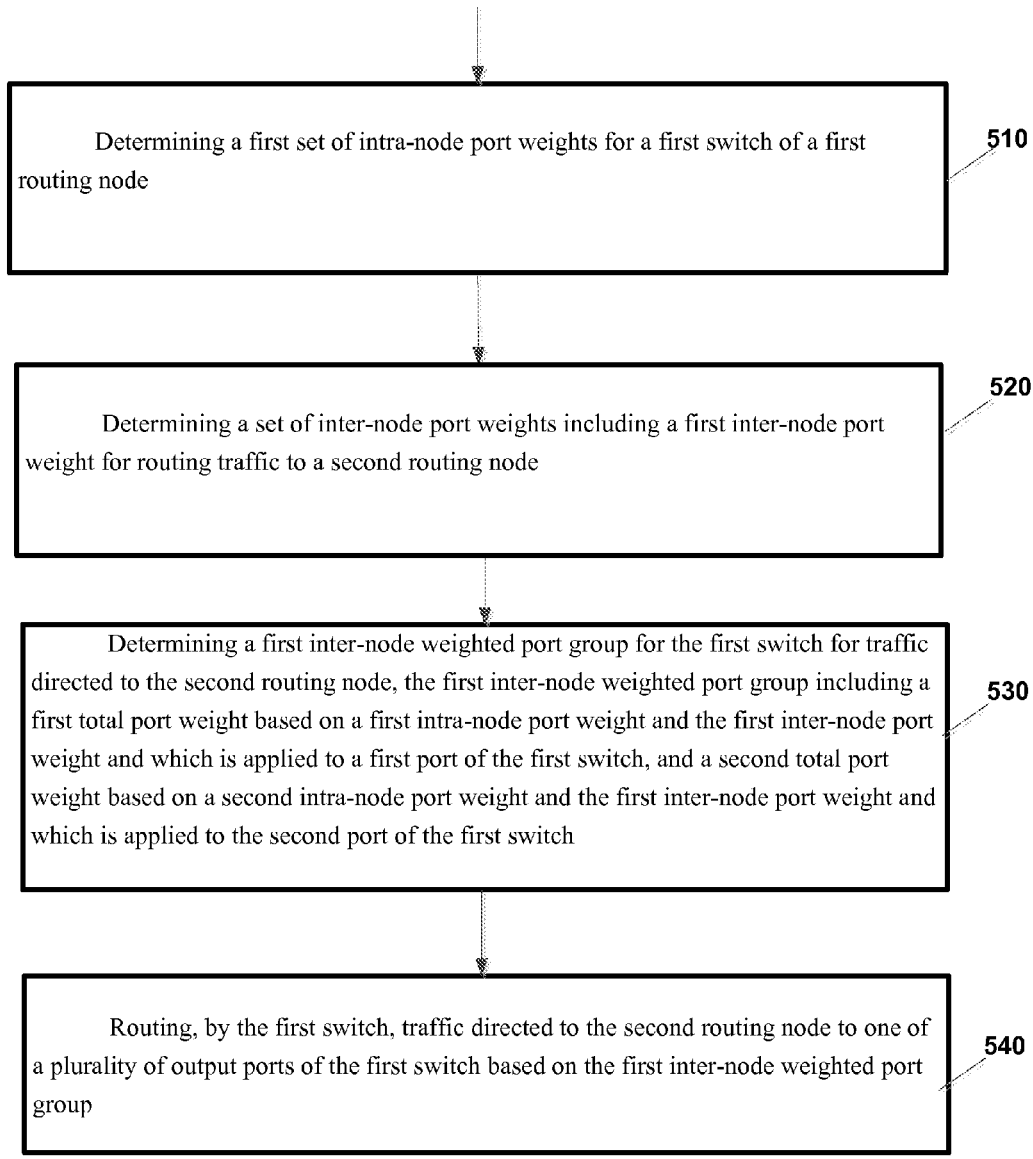
FIG. 5 is a flow chart illustrating operation of a switch or routing node according to an example implementation.

FIG. 5 is a flow chart illustrating operation of a switch or routing node according to an example implementation. At 510, a first set of intra-node port weights is determined for a first switch of a first routing node. At 520, a set of inter-node port weights is determined including a first inter-node port weight for routing traffic to a second routing node. At 530, a first inter-node weighted port group is determined for the first switch for traffic directed to the second routing node, the first inter-node weighted port group including a first total port weight based on a first intra-node port weight and the first inter-node port weight and which is applied to a first port of the first switch, and a second total port weight based on a second intra-node port weight and the first inter-node port weight and which is applied to the second port of the first switch. And, at 540, the first switch routes traffic directed to the second routing node to one of a plurality of output ports of the first switch based on the first inter-node weighted port group.

Figure 6:
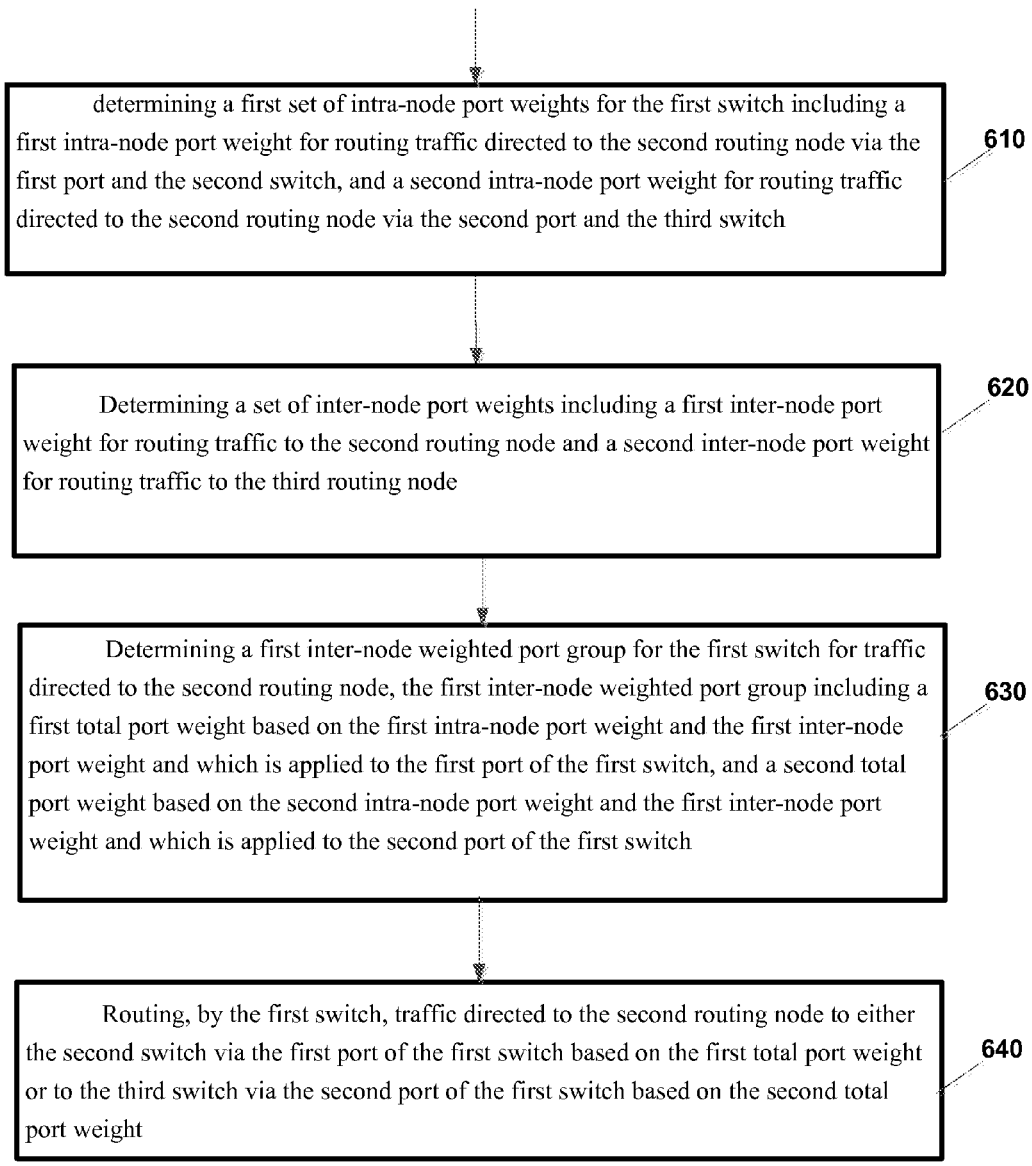
FIG. 6 is a flow chart illustrating operation of a switch or routing node according to another example implementation.

FIG. 6 is a flow chart illustrating operation of a switch or routing node according to another example implementation. FIG. 6 relates to a method of routing traffic from a first routing node to either a second routing node or a third routing node, the first routing node being a multi-stage routing node that includes a first switch that is connected to at least a second switch via a first port and to a third switch via a second port, according to an example implementation.

At 610, a first set of intra-node port weights is determined for the first switch including a first intra-node port weight for routing traffic directed to the second routing node via the first port and the second switch, and a second intra-node port weight for routing traffic directed to the second routing node via the second port and the third switch. At 620, a set of inter-node port weights is determined including a first inter-node port weight for routing traffic to the second routing node and a second inter-node port weight for routing traffic to the third routing node. At 630, a first inter-node weighted port group is determined for the first switch for traffic directed to the second routing node, the first inter-node weighted port group including a first total port weight based on the first intra-node port weight and the first inter-node port weight and which is applied to the first port of the first switch, and a second total port weight based on the second intra-node port weight and the first inter-node port weight and which is applied to the second port of the first switch. At 640, the first switch routes (or forwards) traffic directed to the second routing node to either the second switch via the first port of the first switch based on the first total port weight or to the third switch via the second port of the first switch based on the second total port weight.

Figure 7:
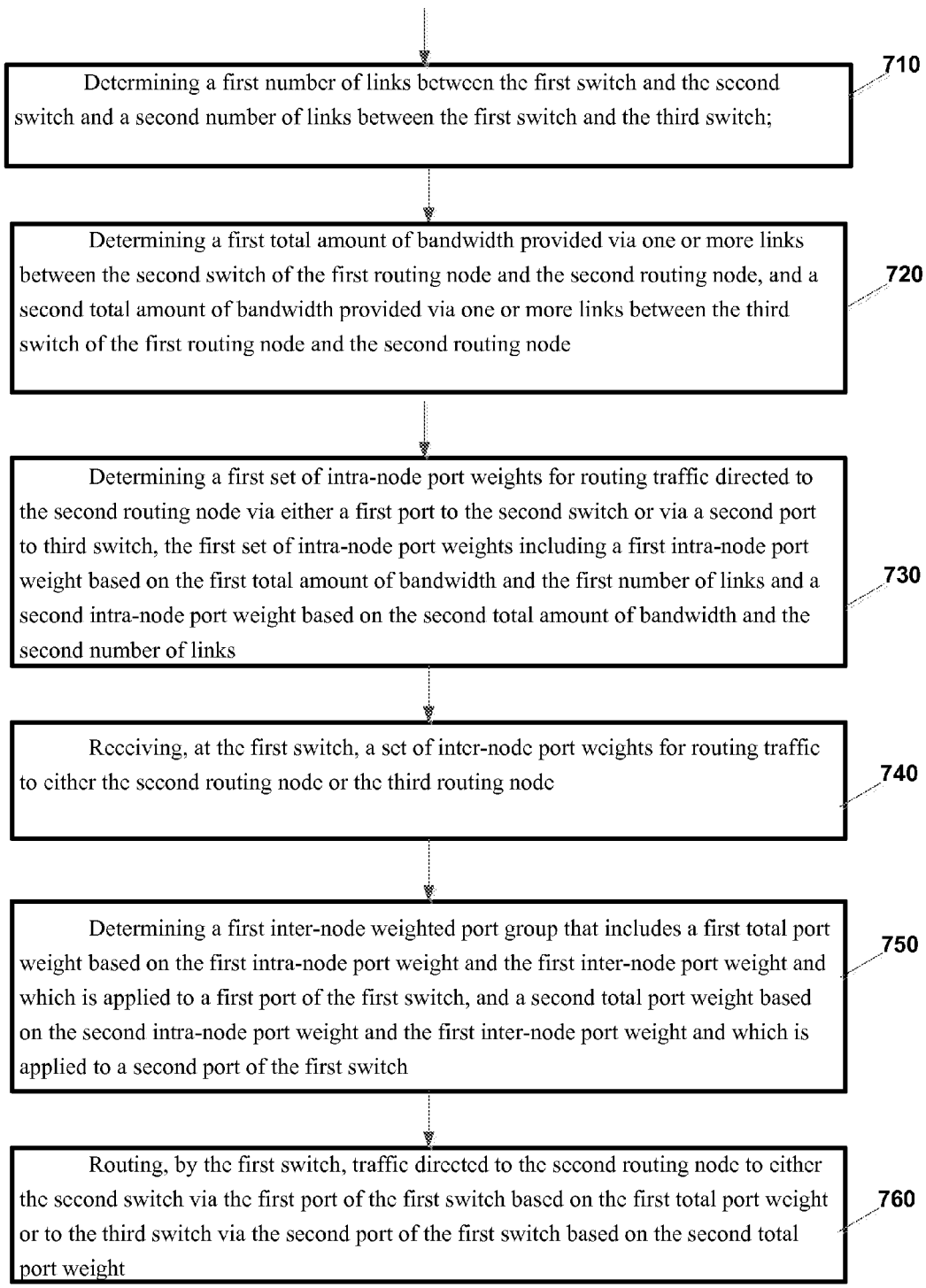
FIG. 7 is a flow chart illustrating operation of a switch or routing node according to an example implementation.

FIG. 7 is a flow chart illustrating operation of a switch or routing node according to yet another example implementation. FIG. 7 relates to a method of routing traffic in a network that includes a first routing node that is connected to a second routing node and a third routing node, wherein the first routing node is a multi-stage routing node that includes a first stage of one or more switches including at least a first switch and a second stage of switches that includes at least a second switch and a third switch, each of the second switch and the third switch being coupled to the first switch, each of the second and third switches of the first routing node being connected to a plurality of adjacent routing nodes including at least the second routing node and the third routing node.

At 710, the following are determined: a first number of links between the first switch and the second switch, and a second number of links between the first switch and the third switch is determined. At 720, the following are determined: a first total amount of bandwidth provided via one or more links between the second switch of the first routing node and the second routing node, and a second total amount of bandwidth provided via one or more links between the third switch of the first routing node and the second routing node. At 730, a first set of intra-node port weights is determined for routing traffic directed to the second routing node via either a first port to the second switch or via a second port to third switch, the first set of intra-node port weights including a first intra-node port weight based on the first total amount of bandwidth and the first number of links and a second intra-node port weight based on the second total amount of bandwidth and the second number of links. At 740, the first switch receives a set of inter-node port weights for routing traffic to either the second routing node or the third routing node. At 750, a first inter-node weighted port group is determined that includes a first total port weight based on the first intra-node port weight and the first inter-node port weight and which is applied to a first port of the first switch, and a second total port weight based on the second intra-node port weight and the first inter-node port weight and which is applied to a second port of the first switch. At 760, the first switch routes (or forwards) traffic directed to the second routing node to either the second switch via the first port of the first switch based on the first total port weight or to the third switch via the second port of the first switch based on the second total port weight.

Figure 8:
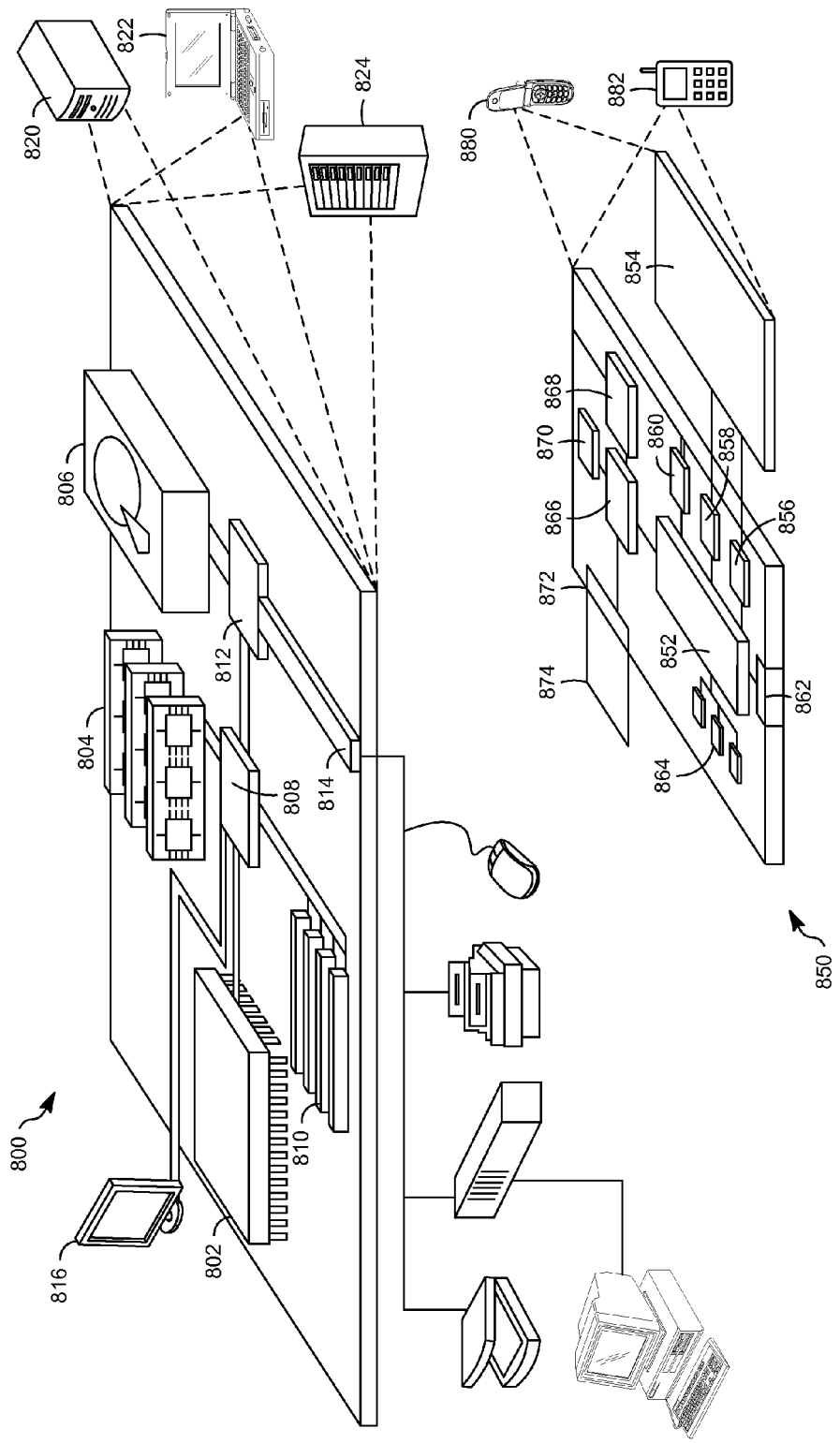
FIG. 8 shows an example of a generic computer device 800 and a generic mobile computer device 850, which may be used with the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 504 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of routing traffic from a first routing node to either a second routing node or a third routing node, the first routing node being a multi-stage routing node that includes a first stage of switches having a first switch that is connected to at least a second switch of a second stage of switches via a first port and to a third switch of the second stage of switches via a second port, the method comprising:

determining a first set of intra-node port weights for the first switch including a first intra-node port weight for routing traffic directed to the second routing node via the first port and the second switch, and a second intra-node port weight for routing traffic directed to the second routing node via the second port and the third switch;

determining a first set of inter-node port weights including a first inter-node port weight for routing traffic to the second routing node and a second inter-node port weight for routing traffic to the third routing node;

determining a first inter-node weighted port group for the first switch for traffic directed to the second routing node, the first inter-node weighted port group including a first total port weight based on the first intra-node port weight and the first inter-node port weight and which is applied to the first port of the first switch, and a second total port weight based on the second intra-node port weight and the first inter-node port weight and which is applied to the second port of the first switch; and routing, by the first switch, traffic directed to the second routing node to either the second switch via the first port of the first switch or to the third switch via the second port of the first switch based on the first and second total port weights.

2. The method of claim 1, further comprising:
establishing a first tunnel from a source to a destination via the first routing node and the second routing node; and
establishing a second tunnel from the source to the destination via the first routing node and the third routing node.

3. The method of claim 1, wherein the determining the first set of intra-node port weights comprises: determining the first intra-node port weight based on a first total amount of bandwidth between the second switch and the second routing node and a first number of links between the first switch and the second switch, and determining the second intra-node port weight based on a second total amount of bandwidth between the third switch and the second routing node and a second number of links between the first switch and the third switch.

4. The method of claim 1, wherein determining the first set of intra-node port weights comprises: determining the first intra-node port weight by dividing a first total amount of bandwidth between the second switch and the second routing node by a first number of links between the first switch and the second switch, and determining the second intra-node port weight by dividing a second total amount of bandwidth between the third switch and the second routing node by a second number of links between the first switch and the third switch.

5. The method of claim 1, further comprising:
updating a forwarding table used by the first switch for the second routing node as a destination to include a first number of entries in the forwarding table for the first port of the first switch based on the first total port weight, and a second number of entries in the forwarding table for the second port of the first switch based on the second total port weight;
wherein the routing comprises:
receiving a packet;
selecting one of the entries in the forwarding table based on one or more fields of the received packet; and
forwarding the received packet via one of the ports of the first switch associated with the selected entry in the forwarding table.

6. The method of claim 1, wherein determining the first inter-node weighted port group comprises: determining the first total port weight based on the first intra-node port weight multiplied by the first inter-node port weight, and determining the second total port weight based on the second intra-node port weight multiplied by the first inter-node port weight.

7. The method of claim 1, further comprising:
determining a second set of intra-node port weights for the first switch including a third intra-node port weight for routing traffic directed to the third routing node via the first port and the second switch, and a fourth intra-node port weight for routing traffic directed to the third routing node via the second port and the third switch; and
determining a second inter-node weighted port group for the first switch for traffic directed to the third routing node, the second inter-node weighted port group including a third total port weight based on the third intra-node port weight and the second inter-node port weight and which is applied to the first port of the first switch, and a fourth total port weight based on the fourth intra-node port weight and the second inter-node port weight and which is applied to the second port of the first switch; and
routing, by the first switch, traffic directed to the third routing node to either the second switch via the first port of the first switch or to the third switch via the second port of the first switch based on the third and fourth total port weights.

8. The method of claim 7, wherein determining the second set of intra node port weights comprises: determining the third intra-node port weight by dividing a third total amount of bandwidth between the second switch and the third routing node by a first number of links between the first switch and the second switch, and determining the second intra-node port weight by dividing a fourth total amount of bandwidth between the third switch and the third routing node by a second number of links between the first switch and the third switch.

9. The method of claim 7, further comprising:
updating a forwarding table used by the first switch for the third routing node as a destination to include a third number of entries in the forwarding table for the first port of the first switch based on the third total port weight, and a fourth number of entries in the forwarding table for the second port of the first switch based on the fourth total port weight;
wherein the routing comprises:
receiving a packet;
determining a destination of the packet as the third routing node;
selecting one of the entries in the forwarding table for the third routing node as a destination based on one or more fields of the received packet; and
forwarding the received packet via one of the ports of the first switch associated with the selected entry in the forwarding table.

10. A method of routing traffic in a network that includes a first routing node that is connected to a second routing node and a third routing node, wherein the first routing node is a multi-stage routing node that includes a first stage of one or more switches including at least a first switch and a second stage of switches that includes at least a second switch and a third switch, each of the second switch and the third switch being coupled to the first switch, each of the second and third switches of the first routing node being connected to a plurality of adjacent routing nodes including at least the second routing node and the third routing node, the method comprising:

determining a first number of links between the first switch and the second switch and a second number of links between the first switch and the third switch;

determining a first total amount of bandwidth provided via one or more links between the second switch of the first routing node and the second routing node, and a second total amount of bandwidth provided via one or more links between the third switch of the first routing node and the second routing node;

determining a first set of intra-node port weights for routing traffic directed to the second routing node via either a first port to the second switch or via a second port to third switch, the first set of intra-node port weights including a first intra-node port weight based on the first total amount of bandwidth and the first number of links and a second intra-node port weight based on the second total amount of bandwidth and the second number of links; and receiving, at the first switch, a first set of inter-node port weights including a first inter-node port weight for routing traffic to the second routing node and a second inter-node port weight for routing traffic to the third routing node;

determining a first inter-node weighted port group that includes a first total port weight based on the first intra-node port weight and the first inter-node port weight and which is applied to the first port of the first switch, and a second total port weight based on the second intra-node port weight and the first inter-node port weight and which is applied to the second port of the first switch; and routing, by the first switch, traffic directed to the second routing node to either the second switch via the first port of the first switch or to the third switch via the second port of the first switch based on the first and second total port weights.

11. The method of claim 10, further comprising:
updating a forwarding table used by the first switch for the second routing node as a destination to include a first number of entries in the forwarding table for the first port of the first switch based on the first total port weight, and a second number of entries in the forwarding table for the second port of the first switch based on the second total port weight; and the routing including:
receiving a packet;
selecting one of the entries in the forwarding table based on one or more fields of the received packet; and
forwarding the received packet via one of the ports of the first switch associated with the selected entry in the forwarding table.

12. The method of claim 10, wherein determining the first inter-node weighted port group comprises: determining the first total port weight based on the first intra-node port weight multiplied by the first inter-node port weight, and determining the and a second total port weight based on the second intra-node port weight multiplied by the first inter-node port weight.

13. The method of claim 10, further comprising:
determining a third total amount of bandwidth provided via one or more links between the second switch and the third routing node, and a fourth total amount of bandwidth provided via one or more links between the third switch and the third routing node;

determining a second set of intra-node port weights for routing traffic directed to the third routing node via either the first port to the second switch or via the second port to third switch, the second set of intra-node port weights including a third intra-node port weight based on the third total amount of bandwidth and the first number of links and a fourth intra-node port weight based on the fourth total amount of bandwidth and the second number of links;

determining a second inter-node weighted port group that includes a third total port weight based on the third intra-node port weight and the second inter-node port weight and which is applied to the first port of the first switch, and a fourth total port weight that includes the fourth intra-node port weight and the second inter-node port weight and which is applied to the second port of the first switch; and routing, by the first switch, traffic directed to the third routing node to either the second switch via the first port of the first switch or to the third switch via the second port of the first switch based on the third and fourth total port weights.

14. The method of claim 13, wherein determining the second inter-node weighted port group comprises: determining the third total port weight based on the third intra-node port weight multiplied by the second inter-node port weight and which is applied to the first port of the first switch, and determining the fourth total port weight based on the fourth intra-node port weight multiplied by the second inter-node port weight and which is applied to the second port of the first switch.

* * * * *